United States Patent [19]

Kotama

[11] Patent Number: 5,284,307
[45] Date of Patent: Feb. 8, 1994

[54] PRELOADER

[75] Inventor: Shigeru Kotama, Aichi, Japan

[73] Assignee: Kabushiki Kaisha Tokai-Rika-Denki-Seisakusho, Aichi, Japan

[21] Appl. No.: 910,549

[22] Filed: Jul. 8, 1992

[30] Foreign Application Priority Data

Jul. 25, 1991 [JP] Japan .............. 3-058725[U]

[51] Int. Cl.⁵ .................................... B60R 22/46
[52] U.S. Cl. .................................... 242/107
[58] Field of Search .......... 242/107, 107.4, 107.4 A, 242/107.4 B; 280/806, 807; 297/476, 477, 478, 480; 60/638

[56] References Cited

U.S. PATENT DOCUMENTS

| | | | |
|---|---|---|---|
| 3,871,470 | 3/1975 | Schwanz et al. | 280/807 X |
| 4,422,669 | 12/1983 | Chiba et al. | 280/806 |
| 4,423,846 | 1/1984 | Fohl | 242/107 |
| 4,573,322 | 3/1986 | Fohl | 280/806 X |
| 4,789,185 | 12/1988 | Fohl | 280/806 |
| 5,037,134 | 8/1991 | Tabata | 280/806 |
| 5,050,814 | 9/1991 | Butenop et al. | 242/107 |
| 5,163,708 | 11/1992 | Kotama | 242/107 X |

Primary Examiner—John M. Jillions
Attorney, Agent, or Firm—Sixbey, Friedman, Leedom & Ferguson

[57] ABSTRACT

A preloader in which one end of a wire, which is connected to a webbing take-up shaft via a clutch unit when a vehicle is abruptly decelerated, is fixed to a piston in a cylinder. The cylinder has a pair of through holes defined therethrough. The through holes are defined further toward a base of the cylinder than the piston is located, when the piston is held in abutment against a leading end of the cylinder. When the vehicle is abruptly decelerated, a large quantity of gas is generated by a gas generator and is introduced into the cylinder, thereby moving the piston to abut against the leading end of the cylinder. In this condition, the gas, which has been introduced into the cylinder, passes through the through holes so as to be discharged from the cylinder to an outside. Accordingly, the high pressure gas does not act on the piston.

11 Claims, 4 Drawing Sheets

PRELOADER

BACKGROUND OF THE INVENTION

1. Field of the Invention:

The present invention relates to a preloader suitable for use with a webbing retractor or the like, for firmly fastening a webbing around an occupant when a vehicle is abruptly decelerated.

2. Description of the Related Art:

In a seat belt system, an occupant is restrained by a webbing when a vehicle is abruptly decelerated. However, the performance of restraint of the occupant by the webbing cannot be sufficiently exhibited when a spacing between the webbing and the occupant is large. Therefore, there has been proposed a webbing retractor provided integrally with a preloader of a type wherein the webbing is firmly applied to the occupant by forcibly pulling the webbing in a webbing winding direction when the vehicle is abruptly decelerated.

In this type of preloader, when the vehicle is abruptly decelerated, a piston is moved along the inside of the cylinder by high pressure gas rapidly generated from a gas generator loaded with an explosive or the like. The movement of the piston is then converted into a rotational force in the webbing winding direction by a clutch means. Afterwards, the rotational force thus converted is transmitted to a webbing take-up shaft so as to wind the webbing on the webbing take-up shaft, thereby firmly applying the webbing to the occupant.

In the preloader, however, the high pressure gas acts on the piston, so that the piston is moved toward the leading end (terminal region of stroke) of the cylinder at a high speed. It is therefore necessary to increase the strength of the leading end of the cylinder.

SUMMARY OF THE INVENTION

With the foregoing in view, it is an object of the present invention to provide a preloader which makes it unnecessary to specially increase the strength of a leading end of a cylinder.

According to one aspect of the present invention, there is provided a preloader comprising gas generating means for generating gas when the vehicle is abruptly decelerated, a piston moved by a generated gas, clutch means for disconnecting the piston from the webbing take-up shaft upon stoppage of the movement of the piston by the gas and connecting the piston to the webbing take-up shaft upon movement of the piston by the gas so as to convert the movement of the piston into a rotational force of the webbing take-up shaft in a webbing winding direction, thereby transmitting the rotational force to the webbing take-up shaft, a cylinder for accommodating the piston such that the piston is movable along an axial direction of the cylinder, and a degassing portion for discharging the gas in the cylinder to the outside when the piston has been moved by the gas so as to reach a vicinity of a terminal region of a traveling stroke thereof.

According to the above construction of the present invention, when the piston is moved along the inside of the cylinder by the gas generated from the gas generating means upon rapid deceleration of the vehicle, the movement of the piston is converted into rotational force to be applied in the webbing winding direction by the clutch means. The rotational force thus converted is then transmitted to the webbing take-up so as to wind a webbing on the webbing take-up shaft, thereby enabling the webbing to be firmly applied to an occupant. When the piston has moved and reached the terminal region of the stroke thereof, the gas in the cylinder is discharged to the outside through the degassing portion. Accordingly, high pressure does not act on the piston. Therefore, a force by which the piston presses the end of the cylinder decreases, and the end of the cylinder in the piston moving direction is not deformed or broken. As the degassing portion, there are known through holes extending through a portion of the cylinder, which is distant from the piston and located on the side opposite the vicinity of the terminal region of the stroke made in the cylinder when the piston has reached the vicinity of the terminal region of the stroke executed in the cylinder. The degassing portion may also be formed as a weak portion which is formed in the piston, and is broken when the piston has reached the vicinity of the terminal region of the stroke executed in the cylinder.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

A webbing retractor 10 to which a preloader according to a first embodiment of the present invention is to be applied will hereinafter be described with reference to FIGS. 1 through 5.

Figure 1:
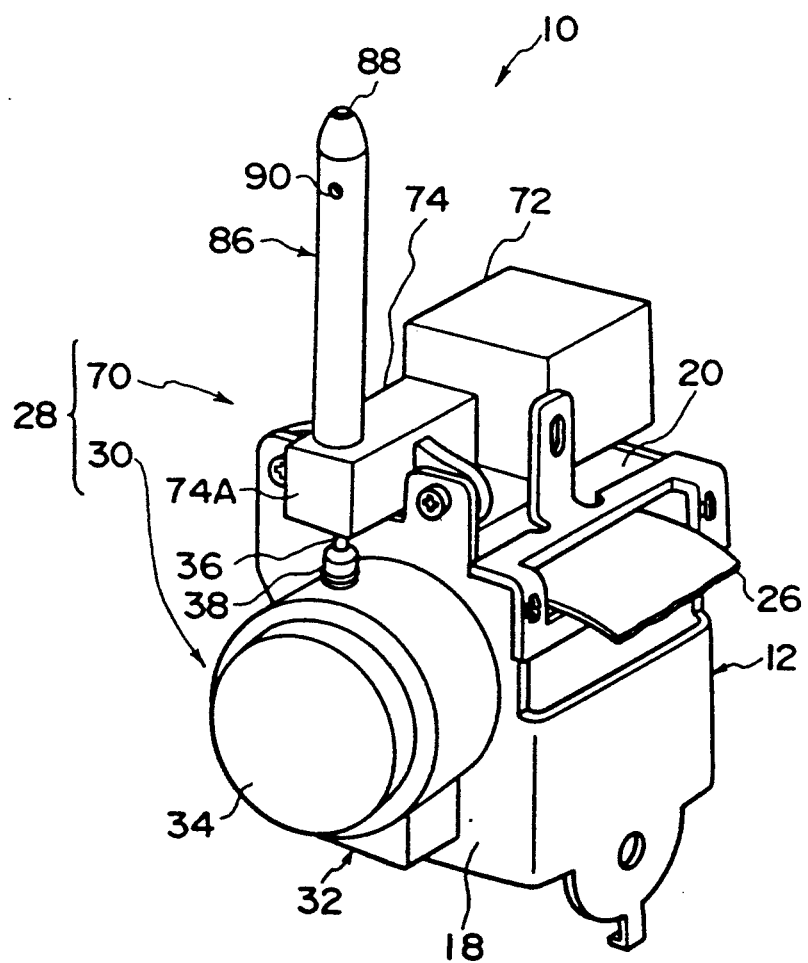
FIG. 1 is a perspective view showing a webbing retractor to which a preloader according to the present invention is applied.
Figure 2:
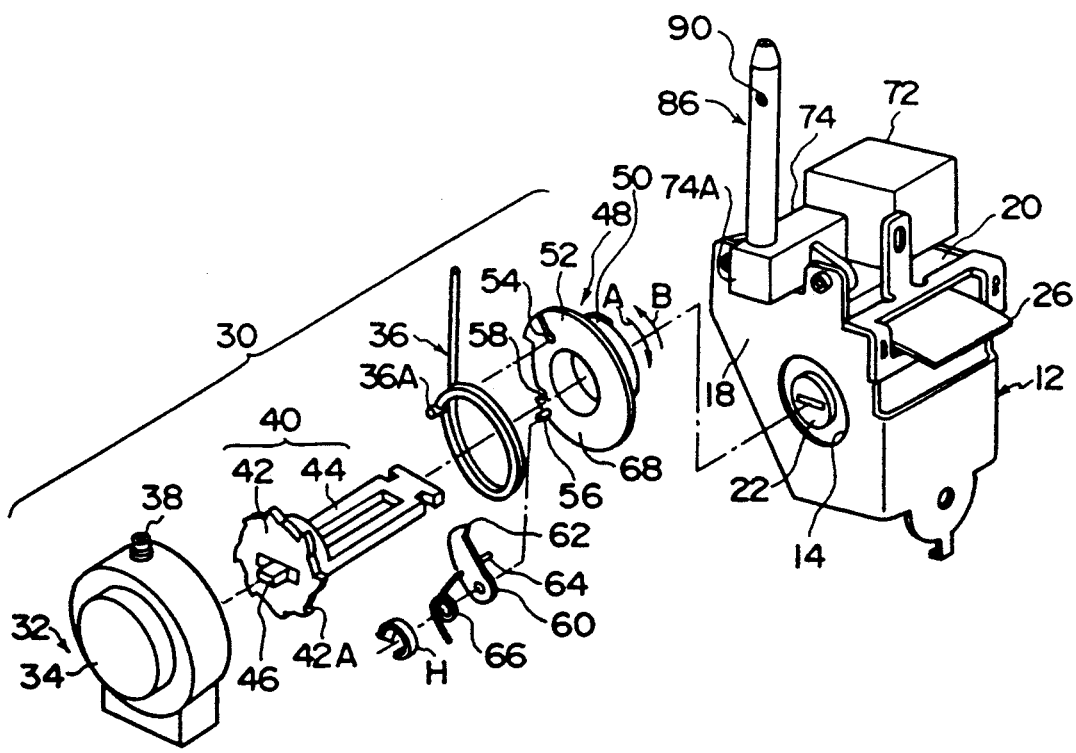
FIG. 2 is a partially-exploded perspective view illustrating a clutch unit of the preloader shown in FIG. 1.

As shown in FIG. 1, the webbing retractor 10 has a frame 12 shaped substantially in the form of a rectangle as seen on a plane. The frame 12 has side portions, i.e., a pair of leg plates 18, 20, which are both bent approximately at a right angle toward the outside from a vehicle interior and extend parallel to each other. As shown in FIG. 2, these leg plates 18, 20 have spindle supporting holes 14 which extend through substantially central portions thereof respectively (FIG. 2 shows only one leg plate 18). Portions near both ends of a webbing take-up shaft 22 are rotatably supported by the spindle supporting holes 14, respectively. A spool (not shown) is fixed to an intermediate portion of the webbing take-up shaft 22 coaxially with the webbing take-up shaft 22. An end of an occupant restraining webbing 26 is held in engagement with the spool.

As shown in FIG. 1, the webbing retractor 10 has a preloader 28 comprising a clutch unit 30, which is disposed on the leg plate 18 side, and a sensor unit 70, which is mounted on the leg plates 18, 20.

As illustrated in FIG. 2, the clutch unit 30 is provided with a spring complete 32. A cover 34 is formed so as to extend toward the front of the vehicle in a state in which it has been attached to the vehicle. A guide 38 for guiding a wire 36 to be described later is formed on the spring complete 32. The spring complete 32 has a ratchet wheel 40 held therein. The ratchet wheel 40 has a ratchet 42 and a plate-shaped shaft 44 which have been combined into a single unit. The shaft 44 is coupled to the webbing take-up shaft 22 so as to be rotated together with the webbing take-up shaft 22. On the other hand, the ratchet 42 is a toothed wheel having a plurality of ratchet teeth 42A formed on the outer peripheral portion thereof. The ratchet 42 has a boss 46 formed in the axial center thereof so as to project in the direction opposite to the direction in which the shaft 44 extends. The boss 46 is coupled to the spring complete 32. An unillustrated flat spiral spring is accommodated in the cover 34 of the spring complete 32. The outer end of the flat spiral spring is held in engagement with the cover 34. The inner end of the flat spiral spring is held in engagement with the boss 46 of the ratchet 42. Thus, a turning force is applied to the webbing take-up shaft 22 by an urging force of the flat spiral spring through the ratchet 42 and the shaft 44, so that the webbing take-up shaft 22 is urged in a webbing winding direction so as to wind the webbing 26 thereon in the form of a roll. The webbing take-up shaft 22 and the ratchet wheel 40 are rotated in a webbing pulling or releasing direction (i.e., in the direction indicated by the arrow B in FIG. 2) against the urging force of the flat spiral spring to thereby enable the webbing 26 to be pulled out from the webbing take-up shaft 22. A rotatable drum 48 shaped substantially in the form of a cylinder is placed between the leg plate 18 and the spring complete 32 and is disposed outwardly from and coaxially with the shaft 44 of the ratchet wheel 40. The rotatable drum 48 has an outer peripheral portion serving as a webbing winding portion 50, and a disk-shaped flange 52 formed in an axially-extending end thereof on the spring complete 32 side. The flange 52 has an engaging hole 54, which is defined in a part of the outer periphery of the flange 52 and is opened in the form of a keyhole. In addition, the flange 52 has a pin 56 formed so as to project toward the spring complete 32 along the axial direction of the rotatable drum 48. A recess 58, which extends from the outer peripheral edge of the flange 52 to the webbing winding portion 50, is defined between the engaging hole 54 and the pin 56.

A pawl lever 60 is rotatably supported by the pin 56 of the rotatable drum 48. The pawl lever 60 corresponds to the ratchet wheel 40. A claw-shaped portion 62 formed in the leading end of the pawl lever 60 is held in meshing engagement with the ratchet tooth 42A of the ratchet 42. A projection 64, which projects toward the rotatable drum 48, is formed in the center of the pawl lever 60.

A torsion coil spring 66 is mounted to the pin 56 of the rotatable drum 48 coaxially with the pawl lever 60. The torsion coil spring 66 has one end held in engagement with an engaging hole 68 and the other end brought into engagement with the pawl lever 60. Therefore, the torsion coil spring 66 serves to urge the claw-shaped portion 62 of the pawl lever 60 in the direction (i.e., in the direction indicated by the arrow H in FIG. 2) in which the claw-shaped portion 62 is moved away from the ratchet tooth 42A. Thus, the claw-shaped portion 62 of the pawl lever 60 is not normally held in engagement with the ratchet tooth 42A of the ratchet 42 of the ratchet wheel 40 by an urging force of the torsion coil spring 66. Therefore, the ratchet wheel 40 can be rotated in the webbing winding and releasing directions independent of the rotatable drum 48.

Figure 3:
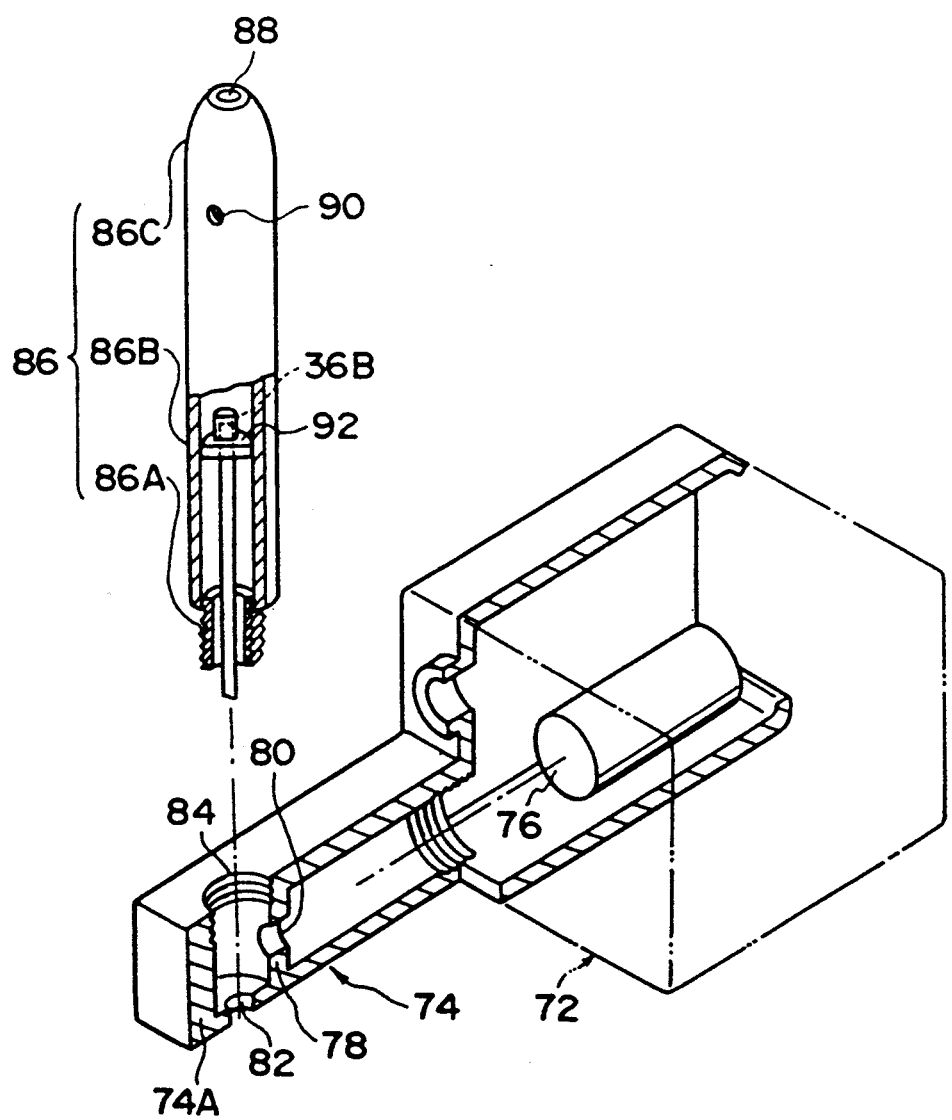
FIG. 3 is an exploded perspective view depicting the manner of attachment of a cylinder shown in FIG. 1.
Figure 4:
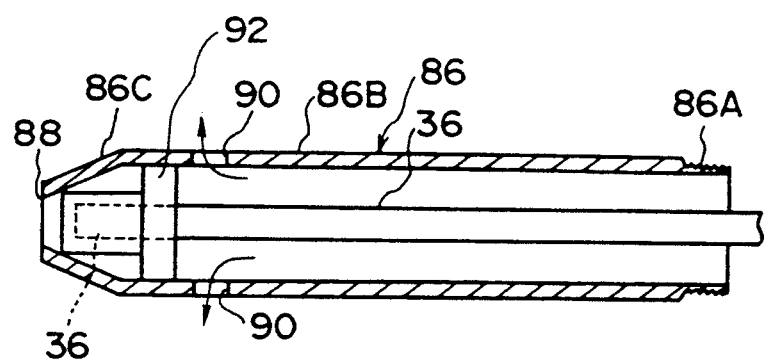
FIG. 4 is a cross-sectional view showing a displaced piston and a cylinder which are employed in a preloader according to a first embodiment.

The intermediate portion of the wire 36 is wound on the webbing winding portion 50 of the rotatable drum 48 in a state in which the projection 64 of the pawl lever 60 is located on the webbing winding portion 50 side. One end 36A of the wire 36 is fitted in the engaging hole 54 of the flange 52 so as to be coupled to the flange 52. As shown in FIGS. 3 and 4, a piston 92 is fixedly mounted on another end 36B of the wire 36.

As shown in FIG. 1, the sensor unit 70 includes a sensor holder 72 shaped in the form of a box and used to hold a preloader sensor (not shown) therein, and an enhancer holder 74 which projects integrally from the sensor holder 72 toward the front of the vehicle and is shaped in the form of a box. The enhancer holder 74 has a cylindrical enhancer (gas generating material) 76 (see FIG. 3) accommodated therein.

As shown in FIG. 3, a partition wall 78 is disposed in the vicinity of a blocking wall 74A formed in the enhancer holder 74. The partition wall 78 is formed integrally with and parallel to the blocking wall 74A. The partition wall 78 has a guide hole 80 defined in a substantially central portion thereof. A wire guide hole 82 is defined between the blocking wall 74A and the partition wall 78 so as to extend through a wall surface of the enhancer holder 74 on the downward side of the vehicle. The wire guide hole 82 is located so as to correspond to the guide 38 of the spring complete 32. A hole 84 for the cylinder, which is disposed coaxially with the wire guide hole 82 and has a diameter larger than that of the wire guide hole 82, is defined in a wall surface of the enhancer holder 74 on the upward side of the vehicle. An internal thread is formed in the inner peripheral surface of the hole 84.

A cylinder 86 shaped in the form of a hollow cylinder is disposed at a position corresponding to the hole 84. The cylinder 86 has a base 86A, an axially-extending intermediate portion 86B and an axially-extending leading end 86C. An external thread is formed in the outer peripheral surface of the base 86A and threadedly engages with the internal thread of the hole 84. The axially-extending leading end 86C is gradually reduced in diameter toward the tip from the axially-extending intermediate portion 86B. A circular hole 88 is defined in the distal end of the axially-extending leading end 86C. When the piston 92 is moved upward as seen in FIG. 3, the axially-extending leading end 86C is held in abutment against the piston 92 so as to control the movement of the piston 92 in the upward direction.

As shown in FIG. 4 as well, a pair of through holes 90 serving as a degassing means extends through the axially-extending intermediate portion 86B. These through holes 90 are disposed in an opposing relationship to each other about the axis of the cylinder. Further, the through holes 90 are disposed on the base 86A side as seen from the piston 92 when the leading end of the piston 92, which is held in the cylinder 86 so as to be slidable along the inner wall of the cylinder 86 and in the axial direction thereof, is located at a position (see FIG. 4) where the leading end of the piston 92 is held in abutment against the axially-extending leading end 86C.

The webbing retractor 10 constructed as described above, in which the preloader has been incorporated, is provided side by side with an acceleration sensor (not shown) for detecting a rapid deceleration of the vehicle and a lock mechanism (not shown) activated by the acceleration sensor so as to momentarily lock the rotation of the webbing take-up shaft 22 in the webbing releasing direction.

When the webbing retractor 10 is applied to a webbing-continuous three-point type seat belt system, the end of the webbing 26, which has been pulled out of the webbing take-up shaft 22, is maintained in engagement with a vehicle body through an unillustrated anchor. The intermediate portion of the webbing 26 is folded at an unillustrated slip joint attached to the vehicle body. Further, an unillustrated tongue plate is attached to an intermediate portion of the webbing 26 between the anchor and the slip joint so as to be slidable along the longitudinal direction of the webbing 26. Furthermore, the webbing 26 is applied to an occupant when the occupant who is seated pulls out the webbing 26 from the webbing take-up shaft 22 and engages the tongue plate with a buckle mounted to the vehicle body.

The operation of the present embodiment will be described below.

When the vehicle is in a normally-driven state after the webbing 26 has been applied to the occupant, the webbing take-up shaft 22 can be rotated in both the webbing winding direction and the webbing releasing direction. Accordingly, the webbing 26 can be freely pulled out of the webbing take-up shaft 22 or wound thereon while following variations in the position of the upper body of the occupant, thereby making it possible to prevent the occupant from being restricted by the webbing 26.

When the vehicle is abruptly decelerated from this condition, the sensor unit 70 detects the rapid deceleration of the vehicle. The enhancer 76 reacts based on the result of the detection by the sensor unit 70 so as to immediately generate a large quantity of gas. The gas passes through the guide hole 80 and is guided into the cylinder 86 so as to become highly pressured, thereby pushing the piston 92 upward as shown in FIG. 3. When the piston 92 is then moved to the position shown in FIG. 4, the piston 92 is brought into abutment against the axially-extending leading end 86C of the cylinder 86. As a result, the intermediate portion of the wire 36, which has been wound onto the webbing winding portion 50 of the rotatable drum 48, is tensioned so as to transmit a tensile force of the wire 36 to the rotatable drum 48. Therefore, the rotatable drum 48 is rapidly rotated in the direction (i.e., in the direction indicated by the arrow A in FIG. 2) in which the webbing 26 is wound on the webbing take-up shaft 22. In addition, the projection 64 of the pawl lever 60 is rolled and fastened by tensioning the intermediate portion of the wire 36. The pawl lever 60 is moved in the axial direction of the rotatable drum 48 against the urging force of the torsion coil spring 66. Therefore, the claw-shaped portion 62 of the pawl lever 60 is held in meshing engagement with the ratchet tooth 42A of the ratchet wheel 40, so that the rotational force of the rotatable drum 48 in the webbing winding direction is immediately transmitted to the ratchet wheel 40.

When the rotational force of the rotatable drum 48 in the direction in which the webbing is wound onto the webbing take-up shaft 22, is transmitted to the ratchet wheel 40, the webbing take-up shaft 22 coupled to the ratchet wheel 40 is also rapidly rotated in the webbing winding direction together with the ratchet wheel 40. Therefore, the webbing 26 is forcibly pulled in the webbing winding direction so as to be firmly applied to the occupant.

The webbing 26 is pulled out of the webbing retractor 10 by the inertial movement of the occupant substantially simultaneously with the pulling movement referred to above. However, an unillustrated lock mechanism for momentarily preventing the webbing take-up shaft 22 from being rotated in the webbing pulling direction is activated to prevent the webbing take-up shaft 22 from being rotated in the webbing pulling direction. As a result, the occupant is reliably restrained in a state in which the webbing 26 is firmly applied to the occupant.

In the state shown in FIG. 4, the gas, which has been guided into the cylinder 86 through the guide hole 80, is discharged to the outside from the cylinder 86 via the through holes 90. Accordingly, the high pressure gas does not act on the piston 92. In addition, the piston 92 does not slip out from the cylinder 86 by an increase in the diameter of the axially-extending leading end 86C, for example. It is therefore unnecessary to specially increase the strength of the axially-extending leading end 86C.

A second embodiment of the present invention will be described below with reference to FIG. 5. In the second embodiment, the through holes 90 employed in the first embodiment are not defined in a cylinder 98. In addition, a piston 96 is different in shape from the piston 92 employed in the first embodiment. Other elements of structure employed in the second embodiment are identical to those employed in the first embodiment.

The piston 96 has a thin-wall portion 96A serving as a degassing means. The thin-wall portion 96A is formed by shaping both end faces of the piston 96 in the form of rings and cutting presses in the ring-shaped portions. The thickness of the thin-wall portion 96A is set such that the thin-wall portion 96A is broken by the gas pressure upon rapid deceleration of the vehicle when the leading end of the piston 96 has been moved, by the high pressure gas, to the position shown in FIG. 5 at which the leading end thereof abuts against the leading end 98C of the cylinder 98.

Figure 5:
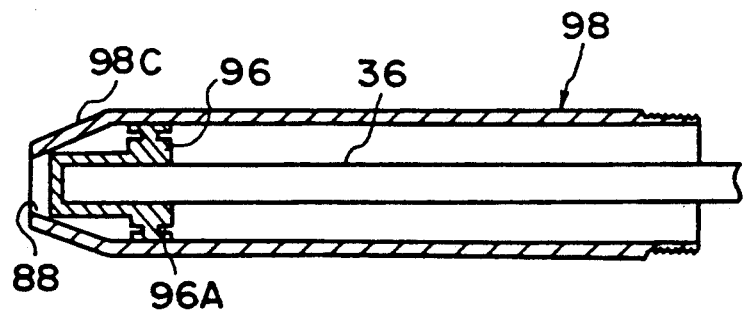
FIg. 5 is a cross-sectional view illustrating a cylinder and a piston both employed in a preloader according to a second embodiment and corresponding to FIG. 4.

As shown in FIGS. 3 and 5, the sensor unit 70 detects the rapid deceleration of the vehicle when the vehicle is abruptly decelerated. Then, the enhancer 76 reacts based on the result of detection by the sensor unit 70 so as to momentarily generate a large quantity of gas. The gas passes through the guide hole 80 and is guided into the cylinder 98 shown in FIG. 5 so as to become highly pressured. As a result, the piston 96 is pressed in the left-hand direction as seen in FIG. 5 (upward as seen in FIG. 3). When the piston 96 reaches the position shown in FIG. 5, the high pressure gas acts on the piston 96 at that position so that the thin-wall portion 96A is broken. Afterwards, the gas flows into the leading end 98C side through the broken thin-wall portion 96A and is discharged to the outside from the cylinder 98 via the circular hole 88. It is therefore unnecessary to specially increase the strength of the leading end 96C of the cylinder 98 because the high pressure gas does not act on the piston 96.

The present invention, which has been constructed as described above, can bring about an excellent advantageous effect in that a preloader, which makes it unnecessary to specially increase the strength of the leading end of the cylinder, can be obtained.

Having now fully described the invention, it will be apparent to those skilled in the art that many changes and modifications can be made without departing from the spirit or scope of the invention as set forth herein.

What is claimed is:

1. A preloader used with a webbing retractor for winding an occupant restraining webbing on a webbing take-up shaft, and used to firmly apply said webbing to an occupant when a vehicle is abruptly decelerated, comprising:

gas generating means for generating gas when the vehicle is abruptly decelerated;

a piston moved by a generated gas;

clutch means for disconnecting said piston from said webbing take-up shaft when said piston is stopped, and connecting said piston to said webbing take-up shaft upon the movement of said piston by the gas so as to convert the movement of said piston into a rotational force of said webbing take-up shaft in a webbing winding direction, thereby transmitting said rotational force to said webbing take-up shaft;

a cylinder for accommodating said piston such that said piston is movable along an axial direction of said cylinder; and a degassing portion for discharging the gas in said cylinder to an outside when said piston has been moved by the gas so as to reach a vicinity of a terminal region of a traveling stroke thereof, wherein said cylinder is a cylindrical member, and said piston is provided in said cylinder, and wherein said degassing portion is a weak portion formed in said piston coaxially with an outer periphery of said piston, said weak portion being broken by a pressure of the gas, when said piston has reached the vicinity of the terminal region of a traveling stroke thereof, so as to lead the gas in said cylinder to the outside.

2. A preloader according to claim 1, wherein said degassing portion is through holes which penetrate inner and outer portions of said cylinder.

3. A preloader according to claim 2, wherein said through holes are disposed behind said piston and in a vicinity of a the rear end of said piston when said piston has reached the vicinity of the terminal region of a traveling stroke thereof.

4. A preloader according to claim 1, wherein said gas generating means is coupled to one end of said cylinder so as to introduce the gas into said cylinder.

5. A preloader according to claim 4, wherein an inside of said cylinder in a vicinity of another end of said cylinder is shaped substantially in a form of a taper so as to be abuttable against a leading end of said piston.

6. A preloader according to claim 1, wherein said clutch means includes an elongated body having one end fixed to said piston so as to connect said piston to said webbing take-up shaft in accordance with the movement of said piston.

7. A preloader suitable used with a webbing retractor for winding an occupant restraining webbing on a webbing take-up shaft, and used to firmly apply said webbing to an occupant when a vehicle is abruptly decelerated, comprising:

gas generating means for generating gas when the vehicle is abruptly decelerated;

a piston moved by a generated gas;

clutch means for disconnecting said piston from said webbing take-up shaft when said piston is stopped, and connecting said piston to said webbing take-up shaft upon the movement of said piston by the gas so as to convert the movement of said piston into a rotational force of said webbing take-up shaft in a webbing winding direction, thereby transmitting said rotational force to said webbing take-up shaft;

a cylinder formed of a cylindrical member, and accommodating said piston such that said piston is movable along an axial direction of said cylinder; and a thin-wall portion formed in said piston coaxially with an outer periphery of said piston, said thin-wall portion being broken by pressure of the gas so as to lead the gas in said cylinder to an outside when said piston has been moved by the gas so as to reach a vicinity of a terminal region of a traveling stroke thereof.

8. A preloader according to claim 7, wherein said gas generating means is screwed with one end of said cylinder so as to introduce the gas into said cylinder.

9. A preloader according to claim 8, wherein an inside of said cylinder in a vicinity of another end of said cylinder is shaped substantially in a form of a cone so as to be abuttable against a leading end of said piston.

10. A preloader according to claim 9, wherein said cylinder has an aperture defined in another end thereof, said aperture being provided so as to discharge the gas to the outside from said cylinder when said thin-wall portion has been broken.

11. A preloader according to claim 7, wherein said clutch means includes a wire having one end fixed to said piston so as to connect said piston to said webbing take-up shaft in accordance with the movement of said piston.

* * * * *